United States Patent [19]

Minnick

[11] Patent Number: 4,859,732

[45] Date of Patent: Aug. 22, 1989

[54] REINFORCED MOLDING COMPOSITION BASED ON POLY(1,4-CYCLOHEXYLENE DIMETHYLENE TEREPHTHALATE) HAVING IMPROVED CRYSTALLIZATION CHARACTERISTICS

[75] Inventor: Larry A. Minnick, Bluff City, Tenn.

[73] Assignee: Eastman Kodak Company, Rochester, N.Y.

[21] Appl. No.: 158,821

[22] Filed: Feb. 22, 1988

[51] Int. Cl.$^4$ ................................................ C08K 5/05
[52] U.S. Cl. ................................ 524/385; 524/380; 524/605
[58] Field of Search ..................... 524/385, 380, 605

[56] References Cited

U.S. PATENT DOCUMENTS

| | | | |
|---|---|---|---|
| 3,435,093 | 3/1969 | Cope | 260/857 |
| 4,223,113 | 9/1980 | Bier et al. | 525/439 |
| 4,223,125 | 9/1980 | Bier et al. | 528/305 |
| 4,352,904 | 10/1982 | Deyrup | 524/292 |
| 4,486,564 | 12/1984 | Deyrup | 524/308 |

*Primary Examiner*—Lewis T. Jacobs
*Attorney, Agent, or Firm*—John F. Stevens; William P. Heath, Jr.

[57] ABSTRACT

A glass fiber reinforced composition comprising
(a) a poly(1,4-cyclohexylene dimethylene terephthalate) resin,
(b) 10–50% based on total composition weight of glass reinforcing fibers, and
(c) a crystallization promoting amount of at least one linear alcohol having 30–50. These resin compositions have excellent strength, stiffness, and heat resistance and can be molded at temperatures below 150° C.

13 Claims, No Drawings

REINFORCED MOLDING COMPOSITION BASED ON POLY(1,4-CYCLOHEXYLENE DIMETHYLENE TEREPHTHALATE) HAVING IMPROVED CRYSTALLIZATION CHARACTERISTICS

FIELD OF THE INVENTION

The invention relates to poly(1,4 -cyclohexylene dimethylene terephthalate) (PCT) compositions with improved crystallization characteristics due to the presence of primary linear polymeric alcohols. Specifically, the invention is directed to glass fiber reinforced PCT compositions containing these alcohol crystallization aids which have high strength, stiffness and heat resistance properties.

BACKGROUND OF THE INVENTION

Poly(alkylene terephthalate) resins are used for manufacturing fibers, films, and molded articles and have excellent physical properties such as high wear resistance, durability, and heat resistance.

An important class of poly(alkylene terephthalate) resins are the PCT resins based on reactions between 1,4-cyclohexanedimethanol and terephthalic acid or suitable synthetic equivalents. Glass fiber reinforced PCT compositions having high crystallinity have excellent properties with regard to strength, stiffness, and heat resistance. These PCT compositions are useful in applications where high strength, stiffness, and heat resistance are necessary, for example, molded parts for use in the automotive and electronic industries.

High crystallinity is essential to ensure adequate hardness, strength, and heat resistance at elevated temperatures. To ensure adequate crystallinity, PCT compositions generally require mold temperatures of 150° C. or higher. High mold temperatures are possible only with sophisticated molding equipment and require specialized heating means, such as, for example, oil bath heating units. Such units are expensive to purchase and to operate.

Crystallization aids have been suggested as a method of promoting crystallization in poly(alkylene terephthalate) at lower temperatures to lower the required mold temperature. The use of ester compounds as crystallization aids is described, for example, in U.S. Pat. Nos. 4,223,125 and 4,223,113. Other types of crystallization aids include ketones, amides, and sulfonamides. However, these additives can be volatile at high temperatures giving rise to volatility losses of the additives during drying which result in difficulties in drying the PCT compositions after compounding.

Accordingly, a need remains for glass fiber reinforced PCT compositions which can be molded at low temperatures and yet retain adequate and physical properties.

Copending application Ser. No. 158,822 filed on 02/22/88, now U.S Pat. No. 4,803,237, relafes to poly(-terephthalate) containing primary linear polymeric alcohol as a crystallization aid along with glass fibers and certain sodium or potassium salts. Also, U.S. Pat. Nos. 3,435,093, 4,352,904, and 4,486,564 are of interest.

SUMMARY OF THE INVENTION

Accordingly, one object of the present invention is to provide a glass fiber reinforced PCT composition which can be molded at temperatures below about 150° C. and yet retains excellent physical properties.

Another object of the invention is to provide glass fiber reinforced PCT compositions having high crystallinity and good drying characteristics.

These and other objects of the present invention will become apparent from the following specification have been achieved by the present glass fiber reinforced composition comprising:

(1) poly(1,4 cyclohexylene dimethylene terephthalate) having an I.V. of about 0.5–1.0,
(2) about 10–50% based on the total composition weight of glass reinforcing fibers, and
(3) a crystallization promoting amount of at least one linear alcohol having 30–50 carbon atoms of the formula $CH_3(CH_2)_xCH_2OH$ wherein x has an average value of 28–48.

DESCRIPTION OF THE INVENTION

In the present invention a primary linear alcohol of from about 30 to about 50 carbon atoms is used as a crystallization aid for glass fiber reinforced compositions based on poly(1,4 cyclohexylene dimethylene terephthalate). The linear alcohol is present in an amount sufficient to promote crystallization of the PCT resin and thereby allow molding of the glass fiber reinforced PCT composition at mold temperatures below 150° C. The alcohol is present in an amount from about 2 to about 10 wt % of the total glass fiber reinforced PCT composition. Preferably, about 4–6 wt % of the alcohol is present.

The primary linear alcohol may be present as a substantially pure compound or as a mixture of linear alcohols. Such compounds are commercially available as the Unilin series produced by the Petrolite Corporation, which have a narrow molecular weight distribution. The primary linear alcohols which are suitable for use in the present invention should have an average molecular weight such that the volatility of the linear alcohol is low enough so as to prevent difficulties in drying the PCT composition. On the other hand, if the average molecular weight of the alcohol is too high, compatibility problems may exist between the PCT and the alcohol resulting in a two phase system.

Accordingly, the average molecular weight of the alcohol should be greater than about 300 and should not exceed an average molecular weight at which compatibility problems with the PCT become apparent. A preferred average molecular weight range is from about 400 to about 700. Commercially available primary linear alcohols such as Unilin 425 alcohol (molecular weight of 425), Unilin 550 alcohol (molecular weight of 550), and Unilin 700 alcohol (molecular weight of 700) have been found to provide excellent crystallization promoting properties.

The PCT of the present invention may comprise a polyester based substantially on 1,4 cyclohexane dimethanol and terephthalic acid monomer units or may comprise copolymers modified with up to about 10 mol % of copolymerizable acid and/or diol monomers. Preferred comonomers include isophthalic acid, naphthalenedicarboxylic acid, cyclohexane dicarboxylic acid, succinic acid, sebacic acid, adipic acid, ethylene glycol, diethylene glycol, butanediol, hexanediol, and neopentyl glycol, for example.

The PCT of the present invention preferably has an inherent viscosity which is greater than about 0.5. When the inherent viscosity of the PCT resin is lower than 0.5, the glass reinforced PCT resin composition exhibits poor physical properties. The upper limit of the inherent viscosity of the PCT is dependent only on the processibility of the PCT. With very high inherent viscosities, the processibility of the polyester decreases due to difficulties in extrusion, compounding, etc., although the inherent viscosity decreases somewhat as a result of processing. A preferred inherent viscosity range is from about 0.5–1.0 although higher viscosity ranges are considered to be within the scope of the present invention. A particularly preferred inherent viscosity is approximately 0.77.

PCT comprising substantially only 1,4-cyclohexane dimethanol and terephthalic acid monomer units are preferred for use in the present invention since such resins exhibit the best crystallization properties when molded at low temperatures. These resins are commercially available or may be prepared using conventional, well known techniques.

The glass fiber reinforced PCT compositions of the present invention may contain from about 10 to about 50%, based on total composition weight, of reinforcing glass fibers. Glass fibers suitable for use in the present invention may be in the form of glass filaments, threads, fibers, or whiskers, etc. and may vary in length from about ⅛ to about 2 inches. Chopped glass strands having a length of ⅛ to about ¼ inch are preferred. Such glass fibers are well known in the art. For purposes such as the reduction of warpage of molded parts, the PCT resin may be reinforced with a mixture of glass fibers and a plate-like filler such as mica.

Additionally, the compositions of the present invention may contain additives such as stabilizers, colorants, lubricants, flame retardants, and additives to enhance the processibility of the resin. Such additives are generally present in amounts varying from about 0.1 to about 20 wt % based on the total weight of the glass fiber reinforced PCT composition.

The glass fiber reinforced PCT compositions of the present invention may be molded at temperatures below 150° C., and are therefore easily molded without the need for expensive high temperature molding and injection apparatus. The preferred mold temperature of the present compositions is from about 95° C. to about 120° C., since such temperatures can be attained using molding equipment heated by steam or pressurized steam. Even at molding temperatures as low as 95° C., the PCT compositions of the present invention exhibit acceptable crystallinity and smoothness, as well as excellent strength, stiffness, and heat resistant properties.

Other features of the invention will become apparent during the course of the following descriptions of exemplary embodiments which are included for illustration of the invention and are not intended to be limiting thereof.

EXAMPLE 1

A composition of PCT containing 30 wt % glass fiber, 0.25 wt % Weston 619 stabilizer (distearyl penterythritoldiphosphite), and 0.25 wt % Irganox 1010 stabilizer (a conventional hindered phenolic compound), was prepared by melt compounding on a ½ single screw extruder. Crystalline tensile and flexural test bars were molded from this composition on a conventional injection molding machine using a mold cavity temperature of 150° C.

EXAMPLE 2

A second composition of glass fiber reinforced PCT was prepared containing 5 wt % Benzoflex S312 (neopentyl glycol dibenzoate), a known crystallization aid for poly(alkylene terephthalates). Crystalline tensile and flexural test bars were molded using a lowered mold cavity temperature of 120° C.

EXAMPLE 3

A third composition of glass fiber reinforced PCT was prepared containing 5 wt % Unilin 425 alcohol and, surprisingly, crystalline tensile and flexural test bars were also molded using the reduced mold cavity temperature of 120° C.

EXAMPLE 4

A fourth composition of glass fiber reinforced PCT was prepared containing 5 wt % of Unilin 700 and, again surprisingly, partially crystalline tensile and flexural test bars were molded using a mold cavity temperature of 120° C.

Adding the additives (esters and alcohols) to fiber reinforced PCT allowed smooth crystalline parts to be molded using fast mold cycle times (30 sec) and mold cavity temperatures that were considerably less than 150° C., i.e., the temperature required when no crystallization enhancing additives are present. The first cycle DSC (differential scanning calorimeter) melting points indicate the presence of crystallinity in the as-molded blends (see Table 1). These blends also had excellent mechanical properties.

The blends containing primary linear alcohols are considerably less susceptible to additive loss during the process of drying the compounded blend for molding than the blend containing Benzoflex S312 as evidenced by the thermogravimetric analysis (TGA) data presented in Table 2. This is an important advantage since sublimation of the relatively volatile neopentyl glycol dibenzoate is a problem in drying the fiber reinforced PCT composition.

TABLE 1

Effect of Selected Additives on the DSC Characteristics and Mechanical Properties of PCT/30 Wt %; Glass Fiber/0.25 Wt %; Weston 619/0.25 Wt %; Irganox 1010 Compositions

| Example | 1 | 2 | 3 | 4 | ASTM Test Method |
|---|---|---|---|---|---|
| Benzoflex S312 (wt %) | — | 5 | — | — | — |
| Unilin 425 (wt %) | — | — | 5 | — | — |
| Unilin 700 (wt %) | — | — | — | 5 | — |
| Tensile Strength (psi) | 19,450 | 20,980 | 18,710 | 19,870 | D638 |
| Elongation at Break (%) | 4 | 5 | 4 | 4 | D638 |
| Flexural Strength (psi) | 28,990 | 30,590 | 27,800 | 30,500 | D790 |
| Flexural Modulus (psi) | 1,231,000 | 1,204,000 | 1,341,000 | 1,174,000 | D790 |
| Notched Izod Impact | | | | | |

TABLE 1-continued

Effect of Selected Additives on the DSC
Characteristics and Mechanical Properties of PCT/30 Wt %;
Glass Fiber/0.25 Wt %; Weston 619/0.25 Wt %; Irganox 1010 Compositions

| Example | 1 | 2 | 3 | 4 | ASTM Test Method |
|---|---|---|---|---|---|
| (ft-lb/in.) 23° C. Unnotched Izod Impact | 1.8 | 1.8 | 1.6 | 2.4 | D256 |
| (ft-lb/in.) 23° C. Heat Deflection Temperature | 15.8 | 16.2 | 13.3 | 18.0 | D256 |
| at 264 psi, °C. | >260 | 258 | >260 | >260 | D648 |
| DSC (1st Cycle) Tm °C. | 293 | 287 | 290 | 292 | DSC |
| (2nd Cycle) Tg °C. | 92 | 70 | 73 | 83 | DSC |
| Tch °C. | 136 | 112 | 113 | 126 | DSC |
| Tm °C. | 293 | 288 | 290 | 292 | DSC |
| Tcc °C. | 239 | 236 | 251 | 239 | DSC |
| Mold Temperature (°C.) | 150 | 120 | 120 | 120 | |

TABLE 2

Volatility of PCT/30 Wt %; Glass Fiber/0.25 Wt %;
Weston 619/0.25 Wt %; Irganox 1010;
Containing 5 Wt % Alcohol Additive

| Additive | Thermogravimetric Analysis (TGA) Weight Loss (%) After 4 Hr in Air @ | | | |
|---|---|---|---|---|
| | 50° C. | 100° C. | 150° C. | 200° C. |
| Benzoflex S312 | 0.2 | 0.4 | 1.4 | 3.2 |
| Unilin 425 | — | 0.2 | 0.4 | 1.2 |

As used herein, the inherent viscosity (I.V.) is measured at 25° C. using 0.50 g of polymer per 100 mL of a solvent consisting of 60% by weight phenol and 40% by weight tetrachloroethane.

Obviously, numerous modifications and variations of the present invention are possible in light of the above teachings. It is, therefore, to be understood that within the scope of the appended claims, the invention may be practiced otherwise than as specifically described herein.

I claim:

1. A glass fiber reinforced composition, comprising:
   (a) a poly(1,4 cyclohexylene dimethylene terephthalate) resin having an I.V. of about 0.5–1.0,
   (b) 10–50 wt % of glass reinforcing fibers, and
   (c) a crystallization promoting amount of at least one linear alcohol having 30–50 carbon atoms.

2. The composition of claim 1, wherein said poly(1,4 cyclohexylene dimethylene terephthalate) comprises up to 10 mol % of a copolymerizable acid or diol monomer.

3. The composition of claim 2, wherein said copolymerizable monomer is selected from the group consisting of isophthalic acid, naphthalenedicarboxylic acid, cyclohexane dicarboxylic acid, succinic acid, sebacic acid, adipic acid, ethylene glycol, diethylene glycol, butanediol, hexanediol and neopentyl glycol.

4. The composition of claim 1, wherein said glass reinforcing fibers are in the form of glass filaments, fibers, chopped strands or whiskers.

5. The composition of claim 1, wherein the inherent viscosity of said poly(1,4 cyclohexylene dimethylene terephthalate) is greater than 0.5.

6. The composition of claim 5, wherein said inherent viscosity is in the range from about 0.5 to about 1.0.

7. The composition of claim 1, wherein said glass reinforcing fibers are present in 10–50% based on total composition weight.

8. The composition of claim 1, wherein said glass fibers have a length in the range from about ⅛ inch to about 2 inches.

9. The composition of claim 1, wherein said linear alcohol is present in an amount from about 2 to about 10% based on the total composition weight.

10. The composition of claim 9, wherein said linear alcohol is present in an amount from about 4 to about 6% based on the total composition weight.

11. The composition of claim 1, wherein said linear alcohol has an average molecular weight of from about 400 to about 700.

12. The composition of claim 1, further comprising an additive selected from the group consisting of stabilizers, colorants, lubricants, fire retardants, and processing aids.

13. A molded article of the composition of claim 1.

* * * * *